(12) United States Patent
Kim

(10) Patent No.: US 6,304,883 B1
(45) Date of Patent: Oct. 16, 2001

(54) TECHNIQUE FOR MANAGING FILES IN TELEPHONE SWITCHING SYSTEM

(75) Inventor: Jung-Gi Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/902,356

(22) Filed: Jul. 29, 1997

(30) Foreign Application Priority Data

Jul. 29, 1996 (KR) .................................................. 96-31348

(51) Int. Cl.$^7$ ...................................................... G06F 17/30
(52) U.S. Cl. ............................................. 707/205; 379/219
(58) Field of Search ................................ 707/1, 205, 411; 711/103, 104; 379/205, 219, 280

(56) References Cited

U.S. PATENT DOCUMENTS

| | | | |
|---|---|---|---|
| H1814 | * 11/1999 | Browning et al. ................... 379/242 |
| 4,164,017 | 8/1979 | Randell et al. ........................ 714/15 |
| 4,506,346 | 3/1985 | Bennett et al. ....................... 711/156 |
| 4,595,800 | 6/1986 | Nagatomi et al. .................... 379/165 |
| 4,602,132 | 7/1986 | Nagatomi et al. .................... 379/159 |
| 4,703,416 | 10/1987 | Crupi et al. .......................... 711/115 |
| 4,763,354 | 8/1988 | Fukushima et al. .............. 433/217.1 |
| 4,771,425 | * 9/1988 | Baran et al. .......................... 370/458 |
| 4,782,514 | 11/1988 | Oshikata et al ...................... 379/165 |
| 4,821,316 | 4/1989 | Okumura et al. .................... 379/156 |
| 5,029,125 | 7/1991 | Sciupac ................................ 707/205 |
| 5,113,393 | 5/1992 | Kam et al. ........................... 365/185 |
| 5,144,653 | 9/1992 | Masuoka .............................. 379/113 |
| 5,251,254 | 10/1993 | Tanigawa et al. ................... 379/165 |
| 5,276,862 | 1/1994 | McCulley et al. .................... 714/15 |
| 5,291,589 | 3/1994 | Matsuura et al. ..................... 714/15 |
| 5,339,426 | 8/1994 | Aoshima ................................ 713/1 |
| 5,392,427 | 2/1995 | Barrett et al. ........................ 707/205 |
| 5,404,485 | * 4/1995 | Ban ..................................... 711/202 |
| 5,432,927 | 7/1995 | Grote et al. ............................. 713/2 |
| 5,465,292 | 11/1995 | Takahashi et al. ................... 379/164 |
| 5,471,523 | 11/1995 | Smith et al. ......................... 379/165 |
| 5,504,883 | 4/1996 | Coverston et al. .................. 707/202 |
| 5,524,230 | 6/1996 | Sakaue et al. ....................... 711/103 |
| 5,530,673 | 6/1996 | Tobita et al. ......................... 365/185 |
| 5,561,795 | 10/1996 | Sarkar ................................. 707/202 |
| 5,564,011 | 10/1996 | Yammine et al. ..................... 714/15 |
| 5,566,297 | 10/1996 | Devarakonda et al. ............... 714/15 |
| 5,583,856 | 12/1996 | Weirl .................................. 370/359 |
| 5,594,863 | 1/1997 | Stiles ................................... 714/15 |
| 5,625,819 | 4/1997 | Hoffer, Jr. ........................... 707/202 |
| 5,640,448 | 6/1997 | Toyoshima ........................... 379/165 |
| 5,787,445 | * 7/1998 | Daberko .............................. 707/205 |
| 5,787,493 | 7/1998 | Niijima et al. ....................... 711/204 |
| 5,819,275 | * 10/1998 | Badger et al. ....................... 707/100 |
| 5,832,515 | 11/1998 | Ledain et al. ....................... 370/389 |
| 5,839,108 | * 11/1998 | Daberko et al. .................... 707/205 |
| 5,862,083 | 1/1999 | Tobita et al. ........................ 365/185 |
| 5,943,692 | * 8/1999 | Marberg et al. .................... 711/203 |
| 5,974,312 | * 10/1999 | Hayes, Jr. et al. .................. 455/419 |

OTHER PUBLICATIONS

Semiconductor Memories: A Handbook of Design, Manufacture, and Application (2d ed. 1991)( pp. 537 and 398–90).

* cited by examiner

Primary Examiner—Hosain T. Alam
Assistant Examiner—Jean Bolte Fleurantin
(74) Attorney, Agent, or Firm—Robert E. Bushnell, Esq.

(57) ABSTRACT

A file managing apparatus of a switching system includes: a flash memory for storing files used in the switching system: an SRAM for storing the files, which are frequently changed and used, among the files stored in the flash memory; and a central processing unit for storing data in a predetermined area of the SRAM when data related with the files stored in the SRAM is processed, and then reading the stored data periodically, to back up the read data in the flash memory.

29 Claims, 12 Drawing Sheets

| Offset | | Sector | DIR NO |
|---|---|---|---|
| 0 | Disk Information Area (4K) | 0 | |
| 4K | F/W Information Area (4K) | 1 | |
| 8K | F/W History Area (1K*32 = 32K) | 2 | |
| 40K | FAT (8M/4K * 2 = 4K) | A | |
| 44K | System Program Dir. (8K/32 = 256 entry) | B | 00h |
| 52K | System Common Dir. (8K/32 = 256 entry) | D | 01h |
| 60K | System Node0 Dir. (8K/32 = 256 entry) | F | 02h |
| | ⋮ | | |
| | System Node7 Dir. (8K/32 = 256 entry) | | 09h |
| 124K | FW01_A Dir. (4K/32 = 128 entry) | 1F | 10h |
| | FW01_B Dir. (4K/32 = 128 entry) | | |
| | ⋮ | | |
| | FW32_A Dir. (4K/32 = 128 entry) | | 4Fh |
| | FW32_B Dir. (4K/32 = 128 entry) | | |
| 380K | Reserved Area (4K*5 = 20K) | 5F | |
| 400K | | 64 | |
| | General Data Area (8M−400K = 7.6M) | | |
| 8M | | | |

FIG. 3

|      | 0 | 1 | 2 | 3 | 4 | 5 | 6 | 7 | 8 | 9 | A | B | C | D | E | F |
|------|---|---|---|---|---|---|---|---|---|---|---|---|---|---|---|---|
| 00h  | \multicolumn{16}{INFORMATION AREA ID MARK (SEC-INFOREX-DISK)} |
| 10h  | \multicolumn{4}{TOTAL BYTES (8M)} | \multicolumn{4}{SECTOR SIZE (4K)} | \multicolumn{4}{SECTOR/CLUSTER (1)} | \multicolumn{4}{DIR ENTRY SIZE (32)} |
| 20h  | \multicolumn{4}{F/W INFO START (1)} | \multicolumn{4}{TotalSectCount (1)} | \multicolumn{4}{1 F/W INFO SIZE (32)} | \multicolumn{4}{TotalInfoCount (64)} |
| 30h  | \multicolumn{4}{F/W HIST START (2)} | \multicolumn{4}{TotalSectCount (8)} | \multicolumn{4}{1 F/W HIST SIZE (1K)} | \multicolumn{4}{TotalHistCount (32)} |
| 40h  | \multicolumn{4}{FAT START (10)} | \multicolumn{4}{TotalSectCount (1)} | \multicolumn{4}{1 CLUSTER SIZE (1)} | \multicolumn{4}{TotalClstCount(1948)} |
| 50h  | \multicolumn{4}{SysPgmDirStart (11)} | \multicolumn{4}{TotalSectCount (2)} | \multicolumn{4}{1 PGM DIR SIZE (2)} | \multicolumn{4}{TotalPgmDirCount (1)} |
| 60h  | \multicolumn{4}{SysComDirStart (13)} | \multicolumn{4}{TotalSectCount (2)} | \multicolumn{4}{1 COM DIR SIZE (2)} | \multicolumn{4}{TotalComDirCount (1)} |
| 70h  | \multicolumn{4}{SysLocDirStart (15)} | \multicolumn{4}{TotalSectCount (16)} | \multicolumn{4}{1 LOC DIR SIZE (2)} | \multicolumn{4}{TotalLocDirCount (8)} |
| 80h  | \multicolumn{4}{F/W DIR START (31)} | \multicolumn{4}{TotalSectCount (64)} | \multicolumn{4}{1 F/W SIZE (1)} | \multicolumn{4}{TOTAL F/W COUNT (64)} |
| 90h  | \multicolumn{16}{DIRECTORY NO. CONTAINING OFFLINE PACKAGE (IN CASE THAT THERE IS NOT 2*8, FFFFh)} |
| A0h  | \multicolumn{4}{GenAreaStart (100)} | \multicolumn{4}{TotalSectCount(1948)} | FFh | FFh | FFh | FFh | FFh | FFh | FFh | FFh |
| B0h  | \multicolumn{6}{FORMAT TIME (YEAR MONTH DAY HOUR MINUTE)} | FFh | FFh | FFh | FFh | FFh | FFh | FFh | FFh | FFh | FFh |
| C0h  | \multicolumn{3}{SRAM-FLASH BACKUP TIME} | FFh | FFh | FFh | \multicolumn{3}{FLASH BACKUP COUNT} | FFh | FFh | FFh | FFh | FFh | FFh |
| D0h  | FFh | FFh | FFh | FFh | FFh | FFh | FFh | FFh | FFh | FFh | FFh | FFh | FFh | FFh | FFh | FFh |
| 3F0h | FFh | FFh | FFh | FFh | FFh | FFh | FFh | FFh | FFh | FFh | FFh | FFh | FFh | FFh | FFh | FFh |
| 400h | \multicolumn{16}{HISTORY AREA ID MARK (PACKAGE0HISTORY)} |
| 410h | \multicolumn{16}{RUNNING SYSTEM PACKAGE VERSION INFO — PGM VER DB VER FFh FFh PGM DATE YEAR MONTH DAY HOUR MINUTE — DB DATE YEAR MONTH DAY HOUR MINUTE} |
| 420h | \multicolumn{4}{TOTAL INST COUNT} | \multicolumn{4}{TOTAL BOOT COUNT} | \multicolumn{4}{INST NEXT INDEXT} | \multicolumn{4}{BOOT NEXT INDEX} |
| 430h | \multicolumn{16}{INSTALL HISTORY (DATE, VERSION, TYPE, FILES)} |
|      | \multicolumn{16}{RECENT 20 HISTORY INFORMATION} |
| 570h | \multicolumn{16}{BOOTING HISTORY (DATE, VERSION, TYPE)} |
|      | \multicolumn{16}{RECENT 20 HISTORY INFORMATION} |
| 660h | FFh | FFh | FFh | FFh | FFh | FFh | FFh | FFh | FFh | FFh | FFh | FFh | FFh | FFh | FFh | FFh |
| 7F0h | FFh | FFh | FFh | FFh | FFh | FFh | FFh | FFh | FFh | FFh | FFh | FFh | FFh | FFh | FFh | FFh |
| 800h | \multicolumn{16}{STATUS AREA ID MARK (DISK-STATUS-AREA)} |
| 810h | \multicolumn{4}{AVAIL SECTOR(1948)} | \multicolumn{4}{USED SECTOR} | \multicolumn{4}{FREE SECTOR} | \multicolumn{4}{ERROR SECTOR} |
| 820h | \multicolumn{4}{UPDATED COUNT} | \multicolumn{2}{LAST CLST} | FFh | FFh | FFh | FFh | FFh | FFh | FFh | FFh | FFh | FFh |
| 830h | FFh | FFh | FFh | FFh | FFh | FFh | FFh | FFh | FFh | FFh | FFh | FFh | FFh | FFh | FFh | FFh |
| FF0h | FFh | FFh | FFh | FFh | FFh | FFh | FFh | FFh | FFh | FFh | FFh | FFh | FFh | FFh | FFh | FFh |

FIG. 4

|     | 0 | 1 | 2 | 3 | 4 | 5 | 6 | 7 | 8 | 9 | A | B | C | D | E | F |
|-----|---|---|---|---|---|---|---|---|---|---|---|---|---|---|---|---|
| 00h | INFORMATION AREA ID MARK (SEC-INFOREX-DISK) ||||||||||||||||
| 10h | TOTAL BYTES (512K) |||| SECTOR SIZE (1K) |||| SECTOR/CLUSTER (2) |||| DIR ENTRY SIZE (32) ||||
| 20h | FAT START (1) |||| TotalSectCount (1) |||| 1 CLUSTER SIZE (2) |||| TotalClstCount(247) ||||
| 30h | SysCOM_DB Start (2) |||| TotalSectCount (8) |||| 1 COM DIR SIZE (8) |||| TotalComDirCount(1) ||||
| 40h | SysLOC_DB Start (10) |||| TotalSectCount (8) |||| 1 LOC DIR SIZE (8) |||| TotalLocDirCount (1) ||||
| 50h | GenAreaStart (18) |||| TotalSectCount(494) |||| FFh | FFh | FFh | FFh | FFh | FFh | FFh | FFh |
| 60h | FORMAT TIME (YEAR MONTH DAY HOUR MINUTE) |||||| FFh | FFh | FFh | FFh | FFh | FFh | FFh | FFh | FFh | FFh |
| 70h | FFh | FFh | FFh | FFh | FFh | FFh | FFh | FFh | FFh | FFh | FFh | FFh | FFh | FFh | FFh | FFh |
| F0h | FFh | FFh | FFh | FFh | FFh | FFh | FFh | FFh | FFh | FFh | FFh | FFh | FFh | FFh | FFh | FFh |
| 100h | HISTORY AREA ID MARK (PACKAGE-HISTORY) ||||||||||||||||
| 110h | RUNNING SYSTEM PACKAGE VERSION INFO ||||||||||||||||
|      | PGM | VER | DB | VER | FFh | FFh | PGM DATE YEAR | MONTH | DAY | HOUR | MINUTE | DB DATE YEAR | MONTH | DAY | HOUR | MINUTE |
| 120h | FFh | FFh | FFh | FFh | FFh | FFh | FFh | FFh | FFh | FFh | FFh | FFh | FFh | FFh | FFh | FFh |
| 1F0h | FFh | FFh | FFh | FFh | FFh | FFh | FFh | FFh | FFh | FFh | FFh | FFh | FFh | FFh | FFh | FFh |
| 200h | STATUS AREA ID MARK (DISK-STATUS-AREA) ||||||||||||||||
| 210h | AVAIL SECTOR(494) |||| USED SECTOR |||| FREE SECTOR |||| ERROR SECTOR ||||
| 220h | LAST UPDATE DATE(COMMON) |||| FFh | FFh | FFh | | UPDATED COUNT |||| FFh | FFh | FFh | FFh |
| 230h | LAST UPDATE DATE(LOCAL) |||| FFh | FFh | FFh | | UPDATED COUNT |||| FFh | FFh | FFh | FFh |
| 240h | FFh | FFh | FFh | FFh | FFh | FFh | FFh | FFh | FFh | FFh | FFh | FFh | FFh | FFh | FFh | FFh |
| 3F0h | FFh | FFh | FFh | FFh | FFh | FFh | FFh | FFh | FFh | FFh | FFh | FFh | FFh | FFh | FFh | FFh |

FIG. 6

| Offset | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| Cluster | 0 | | | | 1 | | | | 2 | | | | 3 | | | |
| 00h | 00h | 01h | EEh | EEh | 00h | 03h | 00h | 04h | EEh | EEh | FFh | FFh | FFh | FFh | FFh | FFh |
| 10h | | | | | | | | | | | | | | | | |
| 20h | FFh | FFh | FFh | FFh | FFh | FFh | FFh | FFh | DDh | DDh | DDh | DDh | DDh | DDh | DDh | DDh |

FIG. 7

|  | 0h | | Ch | Fh |
|---|---|---|---|---|
| 00h | FILE NAME | | | FILE SIZE(ORG) |
| 10h | LOADING ADDRESS | DATE & TIME | ATT CST_NO. | FILE SIZE |

FIG. 8A

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| FFh | FFh | FFh | FFh | FFh | FFh | FFh | FFh | FFh | FFh | FFh | FFh | FFh | FFh | FFh | FFh |
| FFh | FFh | FFh | FFh | FFh | FFh | FFh | FFh | FFh | FFh | FFh | FFh | FFh | FFh | FFh | FFh |

FIG. 8B

TECHNIQUE FOR MANAGING FILES IN TELEPHONE SWITCHING SYSTEM

CLAIM OF PRIORITY

This application makes reference to, incorporates the same herein, and claims all benefits accruing under 35 U.S.C. §119 from an application for APPARATUS AND METHOD FOR MANAGING FILES IN SWITCHING SYSTEM earlier filed in the Korean Industrial Property Office on the $29^{th}$ day of July 1996 and there duly assigned Ser. No. 31348/1996, a copy of which application is annexed hereto.

BACKGROUND OF THE INVENTION

1. Field of the Invention

The present invention relates to a technique for managing files in a telephone switching system, and more specifically, to a technique for managing files of the telephone switching system using a flash memory as a storage medium.

2. Description of the Related Art

Generally, a private branch exchange (PBX) or keyphone system, referred to hereafter as a switching system, includes a central processing unit (CPU) which controls the overall operations of the system including the controlling of switching of talking and providing various services for subscribers. A read only memory stores programs of the CPU and initial service data, for performing fundamental calling and various functions. A random access memory temporarily stores data processed by the CPU. A switching circuit switches various tones and voice data under the control of the CPU. A general subscriber circuit supplies talk current to general telephones and at the same time interfaces signals between the switching circuit and the general telephones under the control of the CPU. A ring generator generates a ring signal and supplies it to a subscriber line. A keyphone subscriber circuit transmits and receives various data to and from keyphones, supplies talk current, and interfaces signals between the keyphones and the switching circuit under the control of the CPU. The keyphones and the general telephones are extension subscribers and the line connecting the general subscriber circuit and the keyphone subscriber circuit to the extension subscribers is the subscriber line.

A tone generator generates various tone signals and supplies them to switching circuit under the control of the CPU. An office line circuit seizes office lines to form an office line speech loop and interfaces signals between the office line and the switching circuit under the control of the CPU. The office line is the line connecting the office circuit to an exchange. The DTMF (dual tone multifrequency) receiver analyzes a DTMF signal supplied from the switching circuit and converting it into digital data and supplies the digital data to the CPU. The DTMF signal received by the DTMF receiver may be a telephone number generated by an extension subscriber through an office line or a telephone number generated by an external subscriber. A DTMF transmitter converts the digital data output from the CPU into a DTMF signal and supplies it to the switching circuit.

The switching circuit described above includes a read only memory for storing the program and initial service data and the random access memory for temporarily storing data processed by the CPU. However, these memories do not have sufficient capacity for storing and managing the entire program and database required in a large-capacity switching system. Accordingly, the switching system uses a hard disk drive as a large-capacity storage medium.

The hard disk drive is connected to the CPU through an input/output controller. The hard disk drive stores the program and database of the switching system and the program and database are controlled and managed by the CPU.

The hard disk needs a separate controller for controlling the interface between the hard disks due to its characteristics. This hard disk control interface is frequently modified because the hard disk is often changed according to its rapid development in computer technology. Furthermore, a fairly large space must be secured for installing the hard disk.

The following patents each disclose features in common with the present invention but do not teach or suggest the specifically recited technique for managing the files of a switching system utilizing a flash memory instead of a hard disk drive: U.S. Pat. No. 5,465,292 to Takahashi et al, entitled Trading Telephone, U.S. Pat. No. 5,471,523 to Smith et al., entitled Telephone Call And Voice Processing System, U.S. Pat. No. 5,640,448 to Toyoshima, entitled Key Telephone System Capable Of Simulation By Button Operations, U.S. Pat. No. 5,251,254 to Tanigawa et al., entitled Control Of Incoming And Outgoing Calls In A Key System, U.S. Pat. No. 5,144,653 to Masuoka, entitled Telephone System Capable Of Automatically Distributing Terminating Calls And Method Of Performing Communication Within The Telephone System, U.S. Pat. No. 4,763,354 to Fukushima et al, entitled Key Telephone System, U.S. Pat. No. 4,782,514 to Oshikata et al., entitled Key Telephone System, U.S. Pat. No. 4,506,346 to Bennett et al, entitled Programmable Cartridge Telephone Communication System, U.S. Pat. No. 4,821,316 to Okumura et al, entitled Key Telephone System, U.S. Pat. No. 4,595,800 to Nagatomi et al., entitled Key, Telephone System, U.S. Pat. No. 4,602,132 to Nagatomi et al., entitled Key Telephone System, U.S. Pat. No. 4,703,416 to Crupi et al., entitled Apparatus For Locating Programs Resident On A Cartridge Of A Cartridge Programmable Communication System, and U.S. Pat. No. 5,583,856 to Weir, entitled Integrated Network Switch With Large Capacitor Switch Architecture Using Selectable Interfaces Between Peripherals And Switch Memories.

SUMMARY OF THE INVENTION

An object of the present invention is to provide a technique for managing files of a switching system, which does not require a separate interface for controlling a storage medium which stores a program and database.

Another object of the present invention is to provide a technique for managing files of a switching system, which does not need a space for a storage medium used for managing the files of is the system.

Still another object of the present invention is to provide a technique for managing files of a switching system, which prevents a storage medium used for managing the files from being frequently changed.

To accomplish the objects of the present invention, a file managing apparatus which is easily connected to a CPU without using a separate controller, so as to process data, uses a flash memory as a storage medium, the flash memory having the characteristic of permanently storing data that the conventional hard disk normally stores, a rapid processing speed and ease of control that general memories have. According to the present invention, the aforementioned conventional problems can be solved, where the space for the hard disk is required, a separate controller is needed, and its interface is frequently changed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 shows the structure of the flash memory of FIG. 2;

FIG. 4 shows the structure of the disk information area of the flash memory of FIG. 3 in detail;

FIG. 6 shows the structure of the disk information area of the SRAM shown in FIG. 5 in detail;

FIG. 7 shows the structure of the file allocation table of the SRAM shown in FIG. 5 in detail;

FIGS. 8a and 8b show the structures of the directory of the SRAM shown in FIG. 5 in detail;

DETAILED DESCRIPTION OF THE PREFERRED EMBODIMENT

Figure 1:
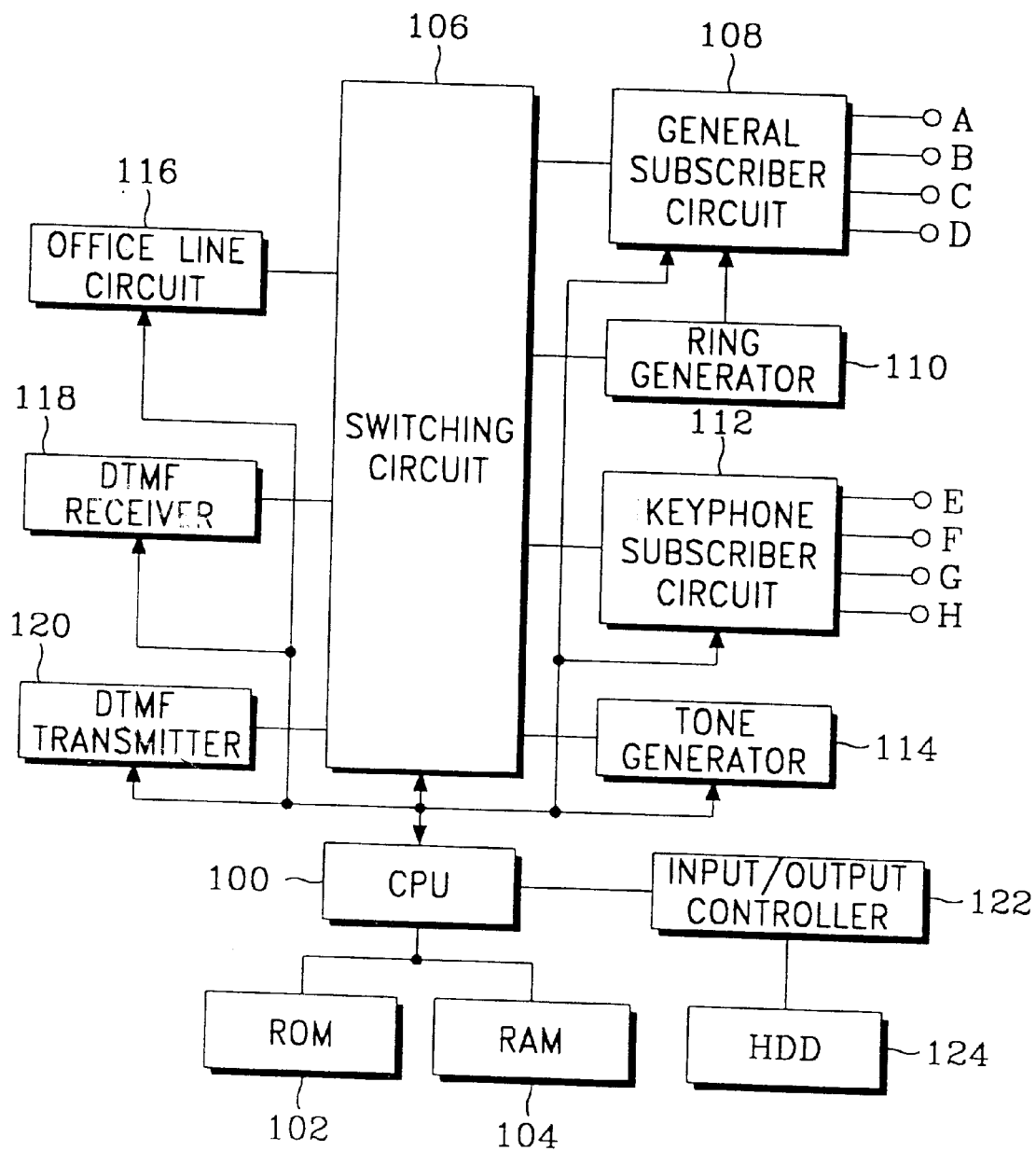
FIG. 1 shows the configuration of a switching system.

Reference will now be made in detail to the preferred embodiment of the present invention, examples of which are illustrated in the accompanying drawings. It should be noted in the drawings that like components are indicated by like reference numerals. In the drawings, there appear many particular details for executing a vertical compression function in order to help general understanding of the present invention. It is obvious for a person having common knowledge on this technology that the present invention can be embodied without the particular details. Moreover, where concrete explanations on obvious functions or configurations may blur the point of this invention, a detailed description thereof has been omitted. Terms used in the following description are defined in the conception of the present invention. These terms can be different depending on the intention or convention of users or inventor, so that the definition of these terms must be based on the overall content of this specification.

Generally, a PBX or keyphone system (referred to hereafter as a "switching system") is constructed as shown in FIG. 1. Referring to FIG. 1, a central processing unit (CPU) 100 controls the overall operations of the system, including the controlling of switching of talking, and providing various services for subscribers. A ROM 102 stores programs of the CPU and initial service data, for performing fundamental calling and various functions. A RAM 104 temporarily stores data processed by the CPU 100. A switching circuit 106 switches various tones and voice data under the control of the CPU 100. A general subscriber circuit 108 supplies talk current to general telephones A, B, C, and D and at the same time, interfaces signals between the switching circuit 106 and general telephones A, B, C and D, under the control of the CPU 100. A ring generator 110 generates a ring signal and supplies it to a subscriber line. A keyphone subscriber circuit 112 transmits/receives various data to/from keyphones E, F, G and H, supplies talk current, and interfaces signals between keyphones E, F, G and H and switching circuit 106, under the control of the CPU 100. Here, IS keyphones E, F, G and H, and general telephones A, B, C and D are extension subscribers, and the line connecting the general subscriber circuit 108 and the keyphone subscriber circuit 112 to the extension subscribers is the subscriber line.

A tone generator 114 generates various tone signals and supplies them to the switching circuit 106 under the control of the CPU 100. An office line circuit 116 seizes office lines to form an office line speech loop, and interfaces signals between the office line and the switching circuit 106, under the control of the CPU 100. The office line is the line connecting the office line circuit 116 to an exchange. A DTMF receiver 118 analyzes a DTMF signal supplied from the switching circuit 106 and converts it into digital data and supplies the digital data to the CPU 100. The DTMF signal received by the DTMF receiver 118 may be a telephone number generated by an extension subscriber through the office line, or a telephone number generated by an external subscriber. A DTMF transmitter 120 converts the digital data output from the CPU 100 into a DTMF signal and supplies it to the switching circuit 106.

As described above, the switching system includes the ROM 102 for storing the program and initial service data, and the RAM 104 for temporarily storing data processed by the CPU 100. However, these memories do not have sufficient capacity for storing and managing the entire program and database required in a large-capacity switching system. Accordingly, the switching system uses a hard disk drive (HDD) as a large-capacity storage medium. As shown in FIG. 1, an HDD 124 is connected to the CPU 100 through an input/output controller 122. The HDD 124 stores the program and database of the switching system, and the program and database are controlled and managed by the CPU 100.

The hard disk needs a separate controller (SCSI controller+power module) for controlling the interface (SCSI) between hard disks due to its characteristic. This hard disk control interface is frequently modified because the hard disk is often changed according to its rapid development in computer technology. Furthermore, a fairly large space must be secured for installing the hard disk.

Figure 2:
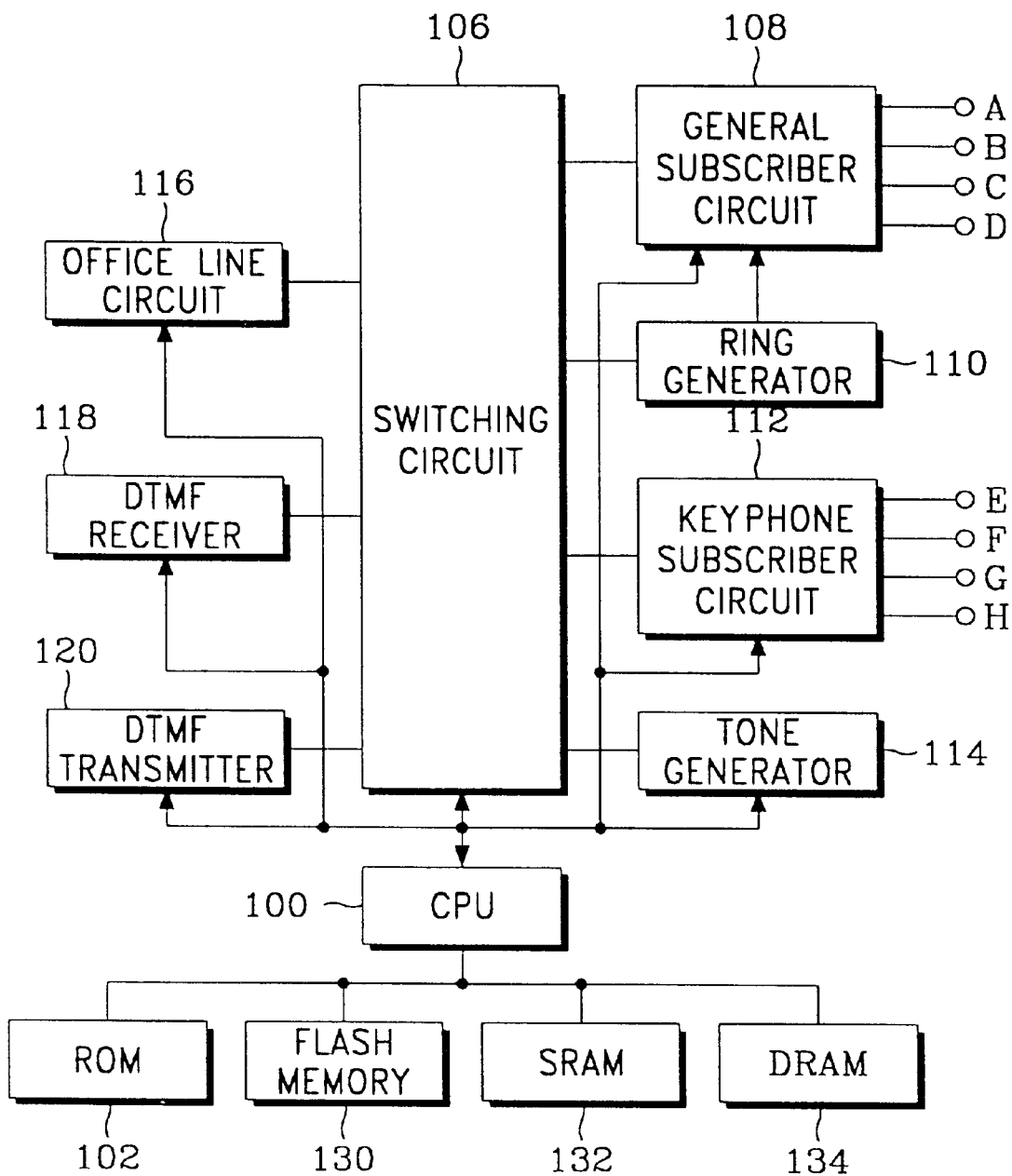
FIG. 2 shows the configuration of a switching system according to the present invention.

FIG. 2 shows the configuration of a switching system according to the present invention. Referring to FIG. 2, the switching system of the present invention includes a ROM 102, a flash memory 130, an SRAM 132, and a DRAM 134 which are storage media for managing files of the system. The storage media are directly connected to a CPU 100 without using a separate controller (interface). This does not require larger space.

It should be noted that data stored in a specific area of the flash memory 130 is deleted, and then new data is stored therein because the characteristic of the flash memory is identical to that of an EPROM. Furthermore, it is required that data storage time be reduced because the life of the flash memory 130 is limited. Accordingly, the present invention includes the flash memory 130 for storing data finally, and the SRAM 132 which is backed up by a battery and buffers the data stored in the flash memory 130. The flash memory 130 and the SRAM 132 are respectively called a ROM disk and a RAM disk hereinafter.

FIG. 3 shows the structure of the flash memory 130, a ROM disk, according to the present invention. The ROM disk is a basic source for storing the program and database of the switching system, and it disk-copies a database, which is frequently modified, in the RAM disk. The ROM disk of the present invention has 4Kbytes of sector size, 4Kbytes of cluster size, 400Kbytes of system sector, and 7.6Mbytes of general sector size. That is, the ROM disk has the structure of 8Mbytes in total.

Referring to FIG. 3, the ROM disk according to the present invention is constituted of a disk information area 0–4K, firmware (F/W) information area 4K–8K, F/W history area 8K–40K, file allocation table (FAT) 40K–44K, system program directory 44K–52K, system common directory 52K–60K, system node directory 60K–124K, FW directory (FW01 A Dir.-FW32$_{13}$B Dir.) 124K–380K, reserved area 380K–400K, and general data area 400K–8M.

FIG. 4 shows the structure of the disk information area of the aforementioned ROM disk in detail. Referring to FIG. 4, the disk information area stores the following information. Areas 00h to 10h of the disk information area store information about information area ID mark (INFORMATION AREA ID MARK), total bytes (TOTAL BYTES), sector size (SECTOR SIZE), sector/cluster (SECTOR/CLUSTER), and directory entry size (DIR ENTRY SIZE). Area 20h stores F/W information area related information of F/W information start location information (F/W INFO START), total sector count value information (TotalSectCount), F/W information size information (F/W INFO SIZE), and total information count value information (TotalInfoCount). Area 30h stores information related to the F/W history area, that is, F/W history start location information (F/W HIST START), total sector count value (TotalSectCount), F/W history size (F/W HIST SIZE), and total history count value (TotalHistCount).

Area 40h of the disk information area stores FAT related information such as FAT start location information (FAT START), total sector count value information (TotalSectCount), cluster size information (CLUSTER SIZE), and total cluster count value information (TotalClstCout). Area 50h stores system program directory related information, that is, system program directory start location (SysPgmDirStart), total sector count value (TotalSectCount), program directory size (PGM DIR SIZE), and total program directory count value (TotalPgmDirCount). Area 60h stores information about the system common DB directory, such as system common DB directory start location (SysComDirStart), total sector count value (TotalSectCount), common DB directory size (COM DIR SIZE), and total common DB directory count value (TotalComDirCount). Area 70h stores information about the system node DB directory, such as system node DB directory start location (SysLocDirStart), total sector count value (TotalSectCount), node DB directory size (LOC DIR SIZE), and total node DB directory count value (TotalLocDirCount). Area 80h stores F/W directory related information of F/W directory start location (F/W DIR START), total sector count value (TotalSectCount), F/W size (F/W SIZE), and total F/W size count value (TOTAL F/W COUNT). Area 90h stores the number of a directory where offline package is included.

Area A0h stores general area start location information (GenAreaStart), and total sector court value information (TotalSectCount). Area B0h stores information about format time (FORMAT TIME), and area C0h stores SRAM-flash memory backup time (SRAM-FLASH BACKUP TIME) and flash backup count value (FLASH BACKUP COUNT). Area 400h stores history area ID mark (HISTORY AREA ID MARK), and area 410h stores system package version information (SYSTEM PACKAGE VERSION INFO). Areas 430h to 570h store install history information (INSTALL HISTORY), and areas 570h to 660h store booting history information (BOOTING HISTORY). Area 800h stores a status area ID mark (STATUS AREA ID MARK), and area 810h stores information about available sector (AVAIL SECTOR), used sector (USED SECTOR), free sector (FREE SECTOR), and error sector (ERROR SECTOR). Area 820h stores information of updated count value (UPDATED COUNT), and last cluster (LAST CLST).

Figure 5:
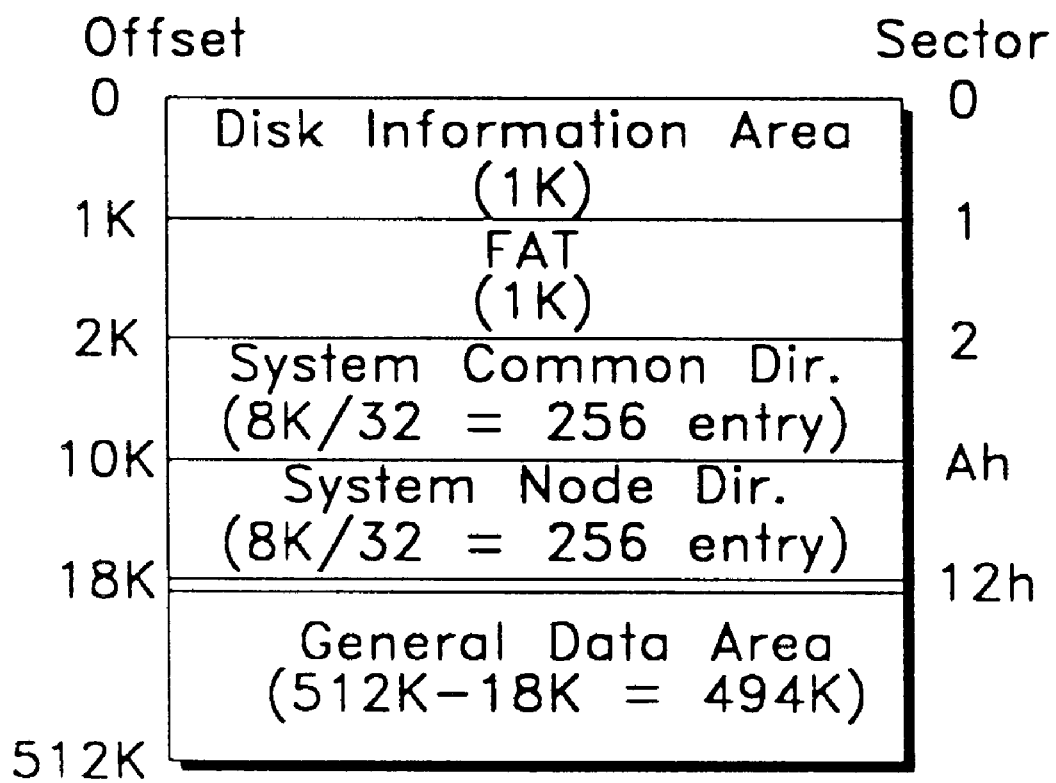
FIG. 5 shows the structure of the SRAM shown in FIG. 2.

FIG. 5 shows the structure of the RAM disk according to the present invention, that is, the SRAM 132 shown in FIG. 2, which is backed up by a battery. The RAM disk has the structure of 512Kbytes in total, that is, 1Kbyte of sector size, 2Kbytes of cluster size, 18Kbytes of system sector size, and 494Kbytes of general sector size. Referring to FIG. 5, the RAM disk of the present invention is constituted of a disk information area 0–1K, FAT 1K–2K, system common DB directory (System Common Dir.) 2K–10K, system node DB directory (System Node Dir.) 10K–18K, and general data area 18K–512K. This RAM disk acts as a working disk for managing data frequently changed, such as database of the switching system. The data stored in the RAM disk is backed up in the ROM disk periodically (once a day). Accordingly, the life limitation of the ROM disk (flash memory) can be minimized.

FIG. 6 shows the structure of the disk information area in detail. Referring to FIG. 6, the disk information area of the RAM disk stores the following information. Area 00h stores information area ID mark (INFORMATION AREA ID MARK), and area 10h stores total bytes (TOTAL BYTES), sector size (SECTOR SIZE), sector/cluster (SECTOR/CLUSTER), and directory entry size (DIR ENTRY SIZE). Area 20h stores FAT start location (FAT START), total sector count value (TotalSectCount), cluster size (CLUSTER SIZE), and total cluster count value (TotalClstCount). Area 30h stores system common DB start location (SysCOM__DB Start), total sector count value (TotalSectCount), common directory size (COM DIR SIZE), and total common directory count value (TotalComDirCount). Area 40h stores system node DB start location (SysLOC__DB Start), total sector count value (TotalSectCount), node directory size (LOC DIR SIZE) and total node directory count value (TotalLocDirCount). Area 50h stores general area start location (GenArea Start), and total sector count value (TotalSectCount). Area 60h stores format time information (FORMAT TIME).

Area 100h stores information about history area ID mark (HISTORY AREA ID MARK), and area 110h stores system package version information (SYSTEM PACKAGE VERSION INFO). Area 200h stores status area ID mark (STATUS AREA ID MARK), and area 210h stores information about an available sector (AVAIL SECTOR), used sector (USED SECTOR), free sector (FREE SECTOR), and error sector (ERROR SECTOR). Area 220h stores the common DB's last updated data (LAST UPDATE DATE) and updated count value (UPDATE COUNT). Area 230h stores the node DB's last updated date (LAST UPDATE DATE) and updated count value (UPDATE COUNT).

FIG. 7 shows the structure of the FAT of the RAM disk shown in FIG. 5 in detail. The FAT of the RAM disk, which is for managing the files in the unit of a cluster, stores link information between clusters. In FIG. 7, FFFFh (free cluster) indicates that a corresponding cluster is free. This is because initializing to FFFFh is effective in case of the flash memory. EEEEh (end cluster) indicates that the corresponding cluster is the end of link. DDDDh (DoNot Exist Cluster)

indicates that the corresponding cluster does not physically exist. BBBBh indicates that the corresponding cluster is in error. The others indicate the numbers of clusters which are linked.

FIG. 8a shows the structure of the directory of the RAM disk shown in FIG. 5, and FIG. 8b shows the initializing value of the directory entry. Referring to FIG. 8a, FILE NAME indicates the name of a file in 12bytes ASCII character. The first character of the file name must be an alphabet letter or numeral. ATT indicates the attribute of a file. The first bit of ATT is for discriminating files from directories. Here, "0" denotes files, and "1" denotes directories. The second bit of ATT is for indicating if file data is compressed or not, where "0" denotes the decompressed state of file data, "1" denoting the compressed state of the file data. The third bit of ATT is for indicating if file data is changed or not, where "1" denotes that the file data is not changed, and "1" denotes that the file data is changed. LOADING ADDRESS indicates an address which will be loaded to the main memory. For example, "FFFFFFFFh" denotes a general data file having no loading address. DATE & TIME indicates a minute/hour/day/month/year when a file is created. For example, if a file is created at 13:14, Nov. 12, 1994, it is indicated by "0Ah 0Bh 0Ch 0Dh 0Eh". CST_NO denotes cluster's number. FILE SIZE (ORG) indicates the size of an original file which is not compressed, and FILE SIZE indicates the size of data stored in the disk. For example, FILE SIZE (ORG) and FILE SIZE are different from each other in case of a file where data is compressed and stored, but they are identical in case of a decompressed file.

Figure 9:
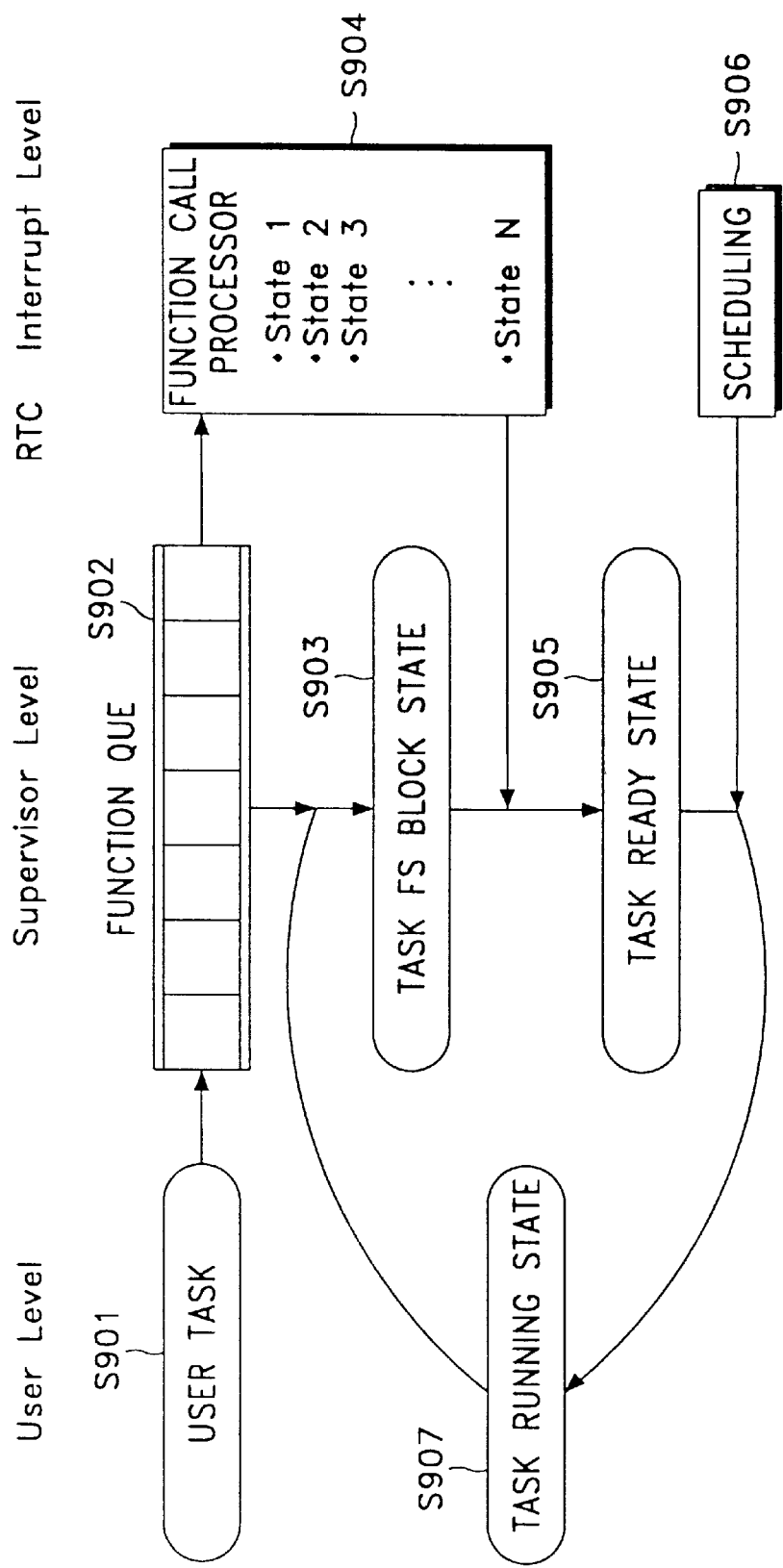
FIG. 9 shows the control flow of the file managing apparatus according to the present invention.

FIG. 9 shows the flow of controlling the file managing apparatus according to the present invention. Referring to FIG. 9, when a user task S901 requests (function-calls) the data management function provided from the file managing apparatus, of the operating system (OS), the OS registers the corresponding request in a function que S902, and transfers the task to a task file managing apparatus (File System) block state. The function call registered in function que S902 is processed through various states State 1 to StateN by a function call processor S904. Here, when the processing of the states is completed, the OS transfers the user task to an executable task ready state S905, performs scheduling S906, and then transfers it to a task running state S907 for the user task operation. In the file managing system of the present invention, which uses the ROM disk having the structure of FIGS. 3 and 4, and the RAM disk having the structure of FIGS. 5, 6, 7, 8a and 8b, and manages the program and database of the switching system according to the flow shown in FIG. 9, the fundamental functions that general user tasks can use are explained below.

(1) Sector Read/Write: This function reads or writes desired data from/to a sector assigned in the ROM and RAM disks.

(2) File Read/Write: This function reads or writes a file in the ROM/RAM disks in the name of file. It indicates the size of data read by the file managing apparatus, and shows if the data is compressed when the file is read. When the file is written, it indicates the original size and compressed size of data to be written by a user task, and information of address in which data is loaded when the data is booting.

(3) Address Find: This function is used to obtain information about a file to which a predetermined section is included is obtained using the address and size information.

(4) File Get/Put: This function reads or writes a file using an address in which the file will be loaded when data is booting without using a file name.

(5) File Delete: This function is used to delete a file, which has an assigned file name and is located in an assigned directory.

(6) Directory List: This function is used to obtain information (file name, address, size, date or attribute) about files in an assigned directory.

(7) Attribute Change: This function changes the attribute of an assigned file, and removes the changed attribute. That is, it backs up the changed files of the RAM disk into the ROM disk, and then removes the changed attribute of the RAM disk.

The process operation in the file managing apparatus according to the present invention, which performs the aforementioned functions, is divided into read operation, write operation and operation to back up changed data of the RAM disk into the ROM disk.

Figure 10:
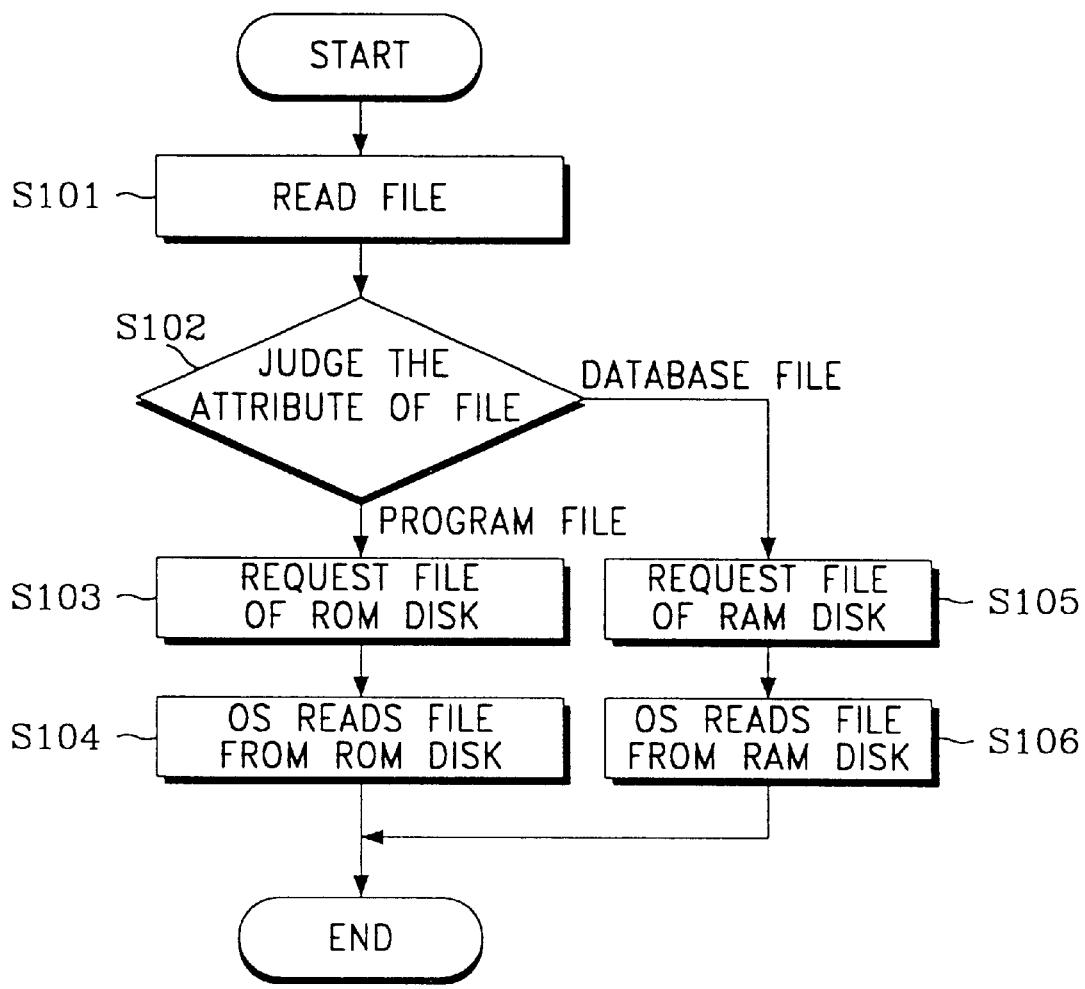
FIG. 10 is a flowchart showing the read operation of the file managing apparatus according to the present invention.

FIG. 10 shows the flow of the read process of the file managing apparatus according to the present invention. This processing operation is performed by the above-described sector read, file read, file get, address find, and directory list functions. In the read processing operation, a file is read at step S101, and the attribute of the read file is judged at step S102. When the read file is a program file, the OS requests the file of the ROM disk at step S103, and then reads the file from the ROM disk at step S104. When the file read at step S101 is a database file, OS requests the file of the RAM disk at step S105, and then reads the file from the RAM disk at step S106.

Figure 11:
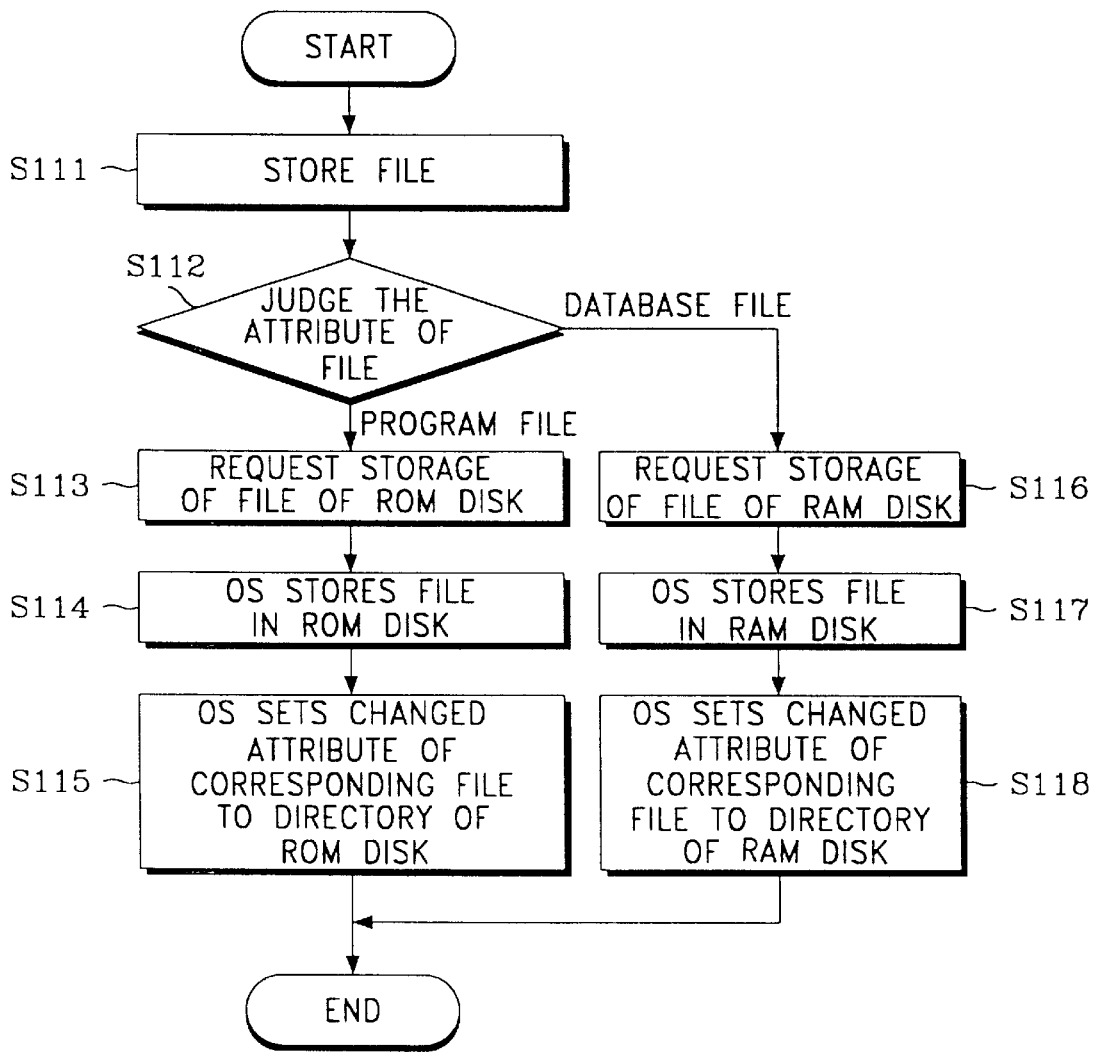
FIG. 11 is a flowchart showing the write operation of the file managing apparatus according to the present invention.

FIG. 11 shows the flow of writing process of the file managing apparatus according to the present invention. This processing operation is performed by the aforementioned sector write, file write, file put and file delete functions. In the writing operation, a file is stored at step S111, and the attribute of the file is judged at step S112. When the file is a program file, the OS requests the file storage of the ROM disk at step S113, stores the file in the ROM disk at step S114, and sets the changed attribute of the corresponding file to a directory of the ROM disk at step S115. When the file stored at step S111 is a database file, the OS requests the file storage of the RAM disk at step S116, stores the file in the RAM disk at step S117, and sets the changed attribute of the corresponding file to a directory of the RAM disk at step S118.

Figure 12:
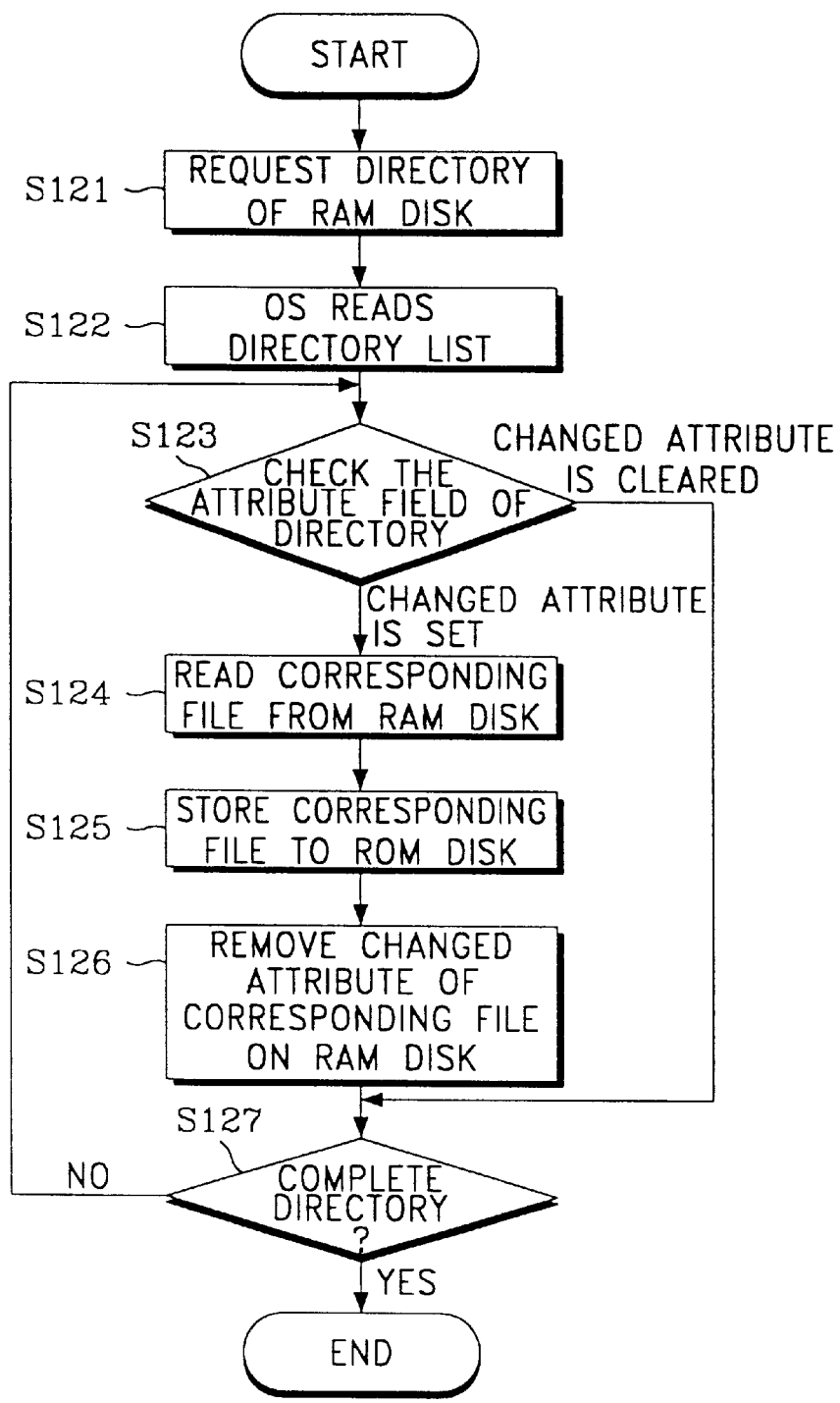
FIG. 12 is a flowchart showing a process where modified data in a RAM disk is backed up in a ROM disk by the file managing apparatus according to the present invention.

FIG. 12 shows the process flow where the changed data of the RAM disk is backed up in the ROM disk by the file managing apparatus according to the present invention. In the operation to back up the changed data of the RAM disk into the ROM disk, a directory of the RAM disk is requested at step S121. The OS reads the directory list at step S122, and checks the attribute field of the directory at step S123. Here, if the changed attribute of the directory is set, the OS reads a corresponding file from the RAM disk at step S124, and stores and backs up the corresponding file in the ROM disk at step S125. Then, the changed attribute of the corresponding file on the RAM disk is removed at step S126. When the OS checks that the changed attribute of the directory is cleared at step S123, the precess proceeds to step S127. Step S127 judges the operations of steps S124, S125 and S126 for all directory of the directory list are performed or not. At this step, the changed data of the RAM disk is checked, and the operation is completed when it is confirmed that the back-up operation is carried out for all directory.

As described above, the present invention provides the file managing apparatus using the flash memory. Accordingly, it is possible to solve the problems generated in the earlier system using the hard disk. Furthermore, the flash memory can be easily controlled without using a separate software driver, in contrast to the hard disk. Data access in the flash memory is much faster than in the hard disk on the order of about 10. The shortcoming of the flash memory, its limited time of data storage, can be overcome by reducing the data storing time using the RAM disk. When the present invention is used in a data processor such as small-capacity switching system which processes below 400 lines, the switching system can be realized by hardware and software structures simpler than the system using the hard disk.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An apparatus for managing data of a telephone switching system, said apparatus comprising:
    a telephone switching system including program and database files for managing said telephone switching system;
    a flash memory storing first data used in managing said telephone switching system, the first data corresponding to infrequently modified files including the program files and the database files;
    a random access memory storing temporary data, said temporary data corresponding to frequently modified files including the database files, said temporary data being written to said random access memory more frequently than said first data are written to said flash memory; and
    a central processing unit writing said temporary data to a predetermined area of said random access memory, and periodically reading said temporary data from said random access memory and then writing said read temporary data to said flash memory to back up said read temporary data, said central processing unit being coupled directly to said flash memory and to said random access memory without an intervening interface unit.

2. The apparatus of claim 1, said flash memory comprising:
    an area for storing disk information, an area for storing firmware information, an area for storing firmware history information, a file allocation table, an area for storing system program directory information, an area for storing system common directory information, an area for storing system node directory information, a reserved area, and an area for storing general data.

3. The apparatus of claim 1, said random access memory comprising:
    an area for storing disk information, a file allocation table, an area for storing system common directory information, an area for storing system node directory information, and an area for storing general data.

4. A method of managing data files of a telephone switching system, said method comprising:
    storing first data files in a flash memory, said first data files being used in operating said telephone switching system, said first data files including program files and database files, said program files and said database files being for operating said system;
    storing temporary data files in a random access memory, and temporarily buffering data in a predetermined database of said random access memory, and then periodically writing said buffered data to said flash memory.

5. The method of claim 4, said random access memory corresponding to a non-volatile static random access memory.

6. The method of claim 4, said temporary data files being stored in said random access memory being classified by directories and stored, an attribute indicating change of data being put in each directory, and, when data related to said temporary data files is processed, the data being stored, substantially simultaneously, and said attribute being changed.

7. The apparatus of claim 3, said random access memory corresponding to a non-volatile static random access memory.

8. A file managing apparatus, comprising:
    a telephone switching system including program and database files for operating said system;
    a flash memory storing infrequently changed files used in operating said telephone switching system, said infrequently changed files including said program and database files;
    a random access memory storing frequently changed and used files, said frequently changed files including said database files; and
    a central processing unit coupled directly to said flash memory without any intervening input/output controller, storing data in a predetermined area of said random access memory when data related with said files stored in said random access memory is processed, and then reading said stored data periodically, to back up said read data to said flash memory.

9. The apparatus of claim 1 said random access memory corresponding to a non-volatile static random access memory.

10. The apparatus of claim 8, said random access memory comprising:
    an area storing disk information;
    a file allocation table;
    an area storing system common directory information;
    an area storing node directory information; and
    an area storing general data.

11. The apparatus of claim 1, wherein said random access memory corresponds to a static random access memory.

12. The apparatus of claim 1, wherein said telephone switching system corresponds to a private branch exchange system.

13. The apparatus of claim 12, wherein said central processing unit controls operations of said private branch exchange system including control of switching of talk connections and providing a plurality of services for subscribers.

14. The apparatus of claim 1, further comprising a switching circuit being coupled to said central processing unit and switching tones and voice data under control of said central processing unit.

15. The apparatus of claim 1, wherein said interface unit corresponds to an input/output controller.

16. The apparatus of claim 1, further comprising a switching circuit being coupled to said central processing unit and to a plurality of telephones, said switching circuit switching tones and voice data among said telephones under control of said central processing unit.

17. The apparatus of claim 1, wherein said first data includes said read temporary data.

18. The method of claim 6, wherein said random access memory corresponds to a non-volatile static random access memory.

19. The method of claim 18, wherein said telephone switching system corresponds to a private branch exchange system.

20. The method of claim 19, further comprising a central processing unit controlling operations of said private branch exchange system including control of switching of talk connections and providing a plurality of services for subscribers.

21. The method of claim 20, further comprising a switching circuit being coupled to said central processing unit and switching tones and voice data under control of said central processing unit.

22. The method of claim 20, further comprising a switching circuit being coupled to said central processing unit and to a plurality of telephones, said switching circuit switching tones and voice data among said telephones under control of said central processing unit.

23. A method of managing files of a telephone switching system, including a flash memory and a random access memory, said method comprising:

storing in said flash memory program and database files which are used in said telephone switching system;

temporarily storing in said random access memory said database files which are used in said telephone switching system, said files stored in said random access memory being changed more frequently than said files stored in said flash memory;

temporarily buffering data related with said files in a predetermined database of said random access memory; and periodically backing up in said flash memory when said data is processed.

24. The method of claim 23, said files being stored in said random access memory being classified by directories and stored, an attribute indicating change of data being put in each directory, and, when data related to said files is processed, the data being stored, simultaneously, and said attribute being changed.

25. The method of claim 23, wherein said telephone switching system corresponds to a private branch exchange system.

26. The method of claim 25, further comprising a central processing unit controlling operations of said private branch exchange system including control of switching of talk connections and providing a plurality of services for subscribers.

27. The method of claim 26, further comprising a switching circuit being coupled to a central processing unit and to a plurality of telephones, said switching circuit switching tones and voice data among said telephones under control of said central processing unit.

28. The apparatus of claim 8, wherein said random access memory corresponds to a static random access memory.

29. A method, comprising:

managing a plurality of program files and database files of a telephone switching system, the plurality of files including a first program file and a first database file, the plurality of files being used in said telephone switching system, said managing further comprising:

storing in a read only memory a first plurality of files used in said telephone switching system, the first plurality of files not being changed frequently, the first plurality of files including the program files and the database files;

storing in a random access memory a second plurality of files used in said telephone switching system, the second plurality of files being changed frequently, the second plurality of files including the database files;

periodically copying at least one of the second plurality of files from the random access memory to the read only memory to back up the at least one of the second plurality of files;

receiving a request to store a first file;

detecting when the first file corresponds to the first program file and when the first file corresponds to the first database file, said detecting being performed by an operating system;

when the first file corresponds to the first program file, requesting storage of the first program file in the read only memory, storing the first program file in the read only memory, and changing an attribute of the first program file to correspond to a directory of the read only memory; and when the first file corresponds to the first database file, requesting storage of the first database file in the random access memory, storing the first database file in the random access memory, and changing an attribute of the first database file to correspond to a directory of the random access memory.

* * * * *